United States Patent
Kunishima et al.

(10) Patent No.: US 10,295,743 B2
(45) Date of Patent: May 21, 2019

(54) OPTICAL SEMICONDUCTOR DEVICE, AND METHOD FOR PRODUCING THE SAME

(71) Applicant: Renesas Electronics Corporation, Koutou-ku, Tokyo (JP)

(72) Inventors: Hiroyuki Kunishima, Tokyo (JP); Yasutaka Nakashiba, Tokyo (JP); Masaru Wakabayashi, Tokyo (JP); Shinichi Watanuki, Tokyo (JP); Ken Ozawa, Tokyo (JP); Tatsuya Usami, Tokyo (JP); Yoshiaki Yamamoto, Tokyo (JP); Keiji Sakamoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/827,779

(22) Filed: Aug. 17, 2015

(65) Prior Publication Data

US 2016/0054521 A1 Feb. 25, 2016

(30) Foreign Application Priority Data

Aug. 21, 2014 (JP) ................. 2014-168259

(51) Int. Cl.
  *G02B 6/12* (2006.01)
  *G02B 6/125* (2006.01)
  *G02B 6/136* (2006.01)

(52) U.S. Cl.
  CPC ............ *G02B 6/125* (2013.01); *G02B 6/136* (2013.01); *G02B 2006/12061* (2013.01)

(58) Field of Classification Search
  CPC ........ G02B 6/136; G02B 6/125; G02B 6/132; G02B 6/29323; G02B 6/29331; G02B 6/29332; G02B 6/2932

(Continued)

(56) References Cited

U.S. PATENT DOCUMENTS

| 2003/0012503 A1* | 1/2003 | Tseng | G02B 6/2835 |
| | | | 385/39 |
| 2004/0101249 A1* | 5/2004 | Tseng | G02B 6/2821 |
| | | | 385/50 |

(Continued)

FOREIGN PATENT DOCUMENTS

| JP | 57-072119 | 5/1982 |
| JP | 62-100706 | 5/1987 |

(Continued)

OTHER PUBLICATIONS

Office Action, dated Feb. 6, 2018, in Japanese Patent Application No. 2014-168259.

*Primary Examiner* — Kaveh C Kianni
*Assistant Examiner* — Hung Q Lam
(74) *Attorney, Agent, or Firm* — Shapiro, Gabor and Rosenberger, PLLC

(57) ABSTRACT

Disclosed is an optical semiconductor device which can be improved in light shift precision and restrained from undergoing a loss in light transmission. In this device, an inner side-surface of a first optical coupling portion of an optical coupling region and an inner side-surface of a second optical coupling portion of the region are increased in line edge roughness. This manner makes light coupling ease from a first to second optical waveguide. By contrast, the following are decreased in line edge roughness: an outer side-surface of the first optical coupling portion of the optical coupling region; an outer side-surface of the second optical coupling portion of the region; two opposed side-surfaces of a portion of the first optical waveguide, the portion being any portion other than the region; and two opposed side-surfaces of a portion of the second optical waveguide, the portion being any portion other than the region.

13 Claims, 12 Drawing Sheets

(58) Field of Classification Search
USPC .................. 385/14, 30, 37, 42, 129–132
See application file for complete search history.

(56) References Cited

U.S. PATENT DOCUMENTS

| | | | | |
|---|---|---|---|---|
| 2008/0273829 A1* | 11/2008 | Saida | ................. | G02B 6/12011 385/14 |
| 2011/0133063 A1* | 6/2011 | Ji | .......................... | G02B 6/122 250/227.24 |
| 2012/0201492 A1* | 8/2012 | Matsumoto | ........ | G02B 6/12007 385/14 |

FOREIGN PATENT DOCUMENTS

| | | |
|---|---|---|
| JP | 06-59142 A | 3/1994 |
| JP | 2009-265123 A | 11/2009 |

* cited by examiner

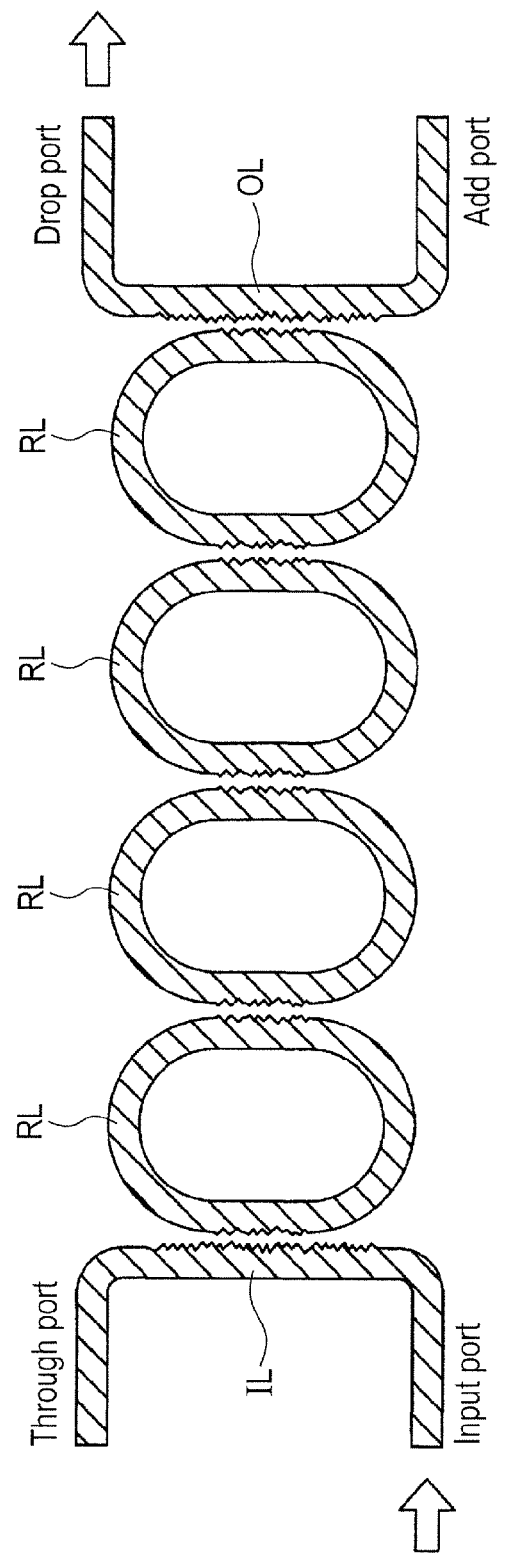

OPTICAL SEMICONDUCTOR DEVICE, AND METHOD FOR PRODUCING THE SAME

CROSS-REFERENCE TO RELATED APPLICATIONS

The disclosure of Japanese Patent Application No. 2014-168259 filed on Aug. 21, 2014 including the specification, drawings and abstract is incorporated herein by reference in its entirety.

BACKGROUND

The present invention relates to an optical semiconductor device, and a technique for producing the device, and is usable suitably for, for example, an optical semiconductor device including an optical directional coupler, and a method for producing the device.

Japanese Patent Application Laid-Open (JP-A) No. Hei 06 (1994) -059142 (Patent Literature 1) describes an optical directional coupler configured by making respective substantially central regions of first and second optical waveguides each formed over a surface of a silicon substrate closely near and parallel to each other over a predetermined length, thereby forming an optical coupling portion, this coupler having a structure in which a glass bank is formed outside each of the optical waveguides of the optical coupling portion, and the glass banks are parallel to each other at an interval of a desired distance and are equal in height to the optical coupling portion.

According to the optical directional coupler described in Patent Literature 1, when light rays having wavelengths different from each other, i.e., first and second wavelengths, respectively, advance from an input-side port of the first optical waveguide, the following is caused in the optical coupling portion: the first-wavelength light ray undergoes coupling between the optical waveguides one time to be emitted out from an output-side port of the second optical waveguide; and the second-wavelength light ray undergoes coupling between the optical waveguides two times to be emitted out from an output-side port of the first optical waveguide. In short, a light ray having a specified wavelength can be shifted from the first optical waveguide to the second optical waveguide.

However, for example, when the optical waveguides are formed to be decreased in line edge roughness (LER: the roughness of side-surfaces of the line pattern, or irregularities in the surfaces) in order to decrease a loss in light transmission in the optical waveguides (such a degree that signals attenuate in accordance with, for example, the transmission distance thereof), there is generated a phenomenon that in the optical coupling portion, a light ray having a specified wavelength is not easily shifted.

SUMMARY

An object of the present invention is to solve the above-mentioned problem. Other objects and novel features of the invention will be made evident from the description of the present specification, and drawings attached thereto.

An optical semiconductor device according to an aspect of the present invention has a first optical waveguide having a first optical coupling portion and made of silicon, and a second optical waveguide having a second optical coupling portion, made of silicon and formed to be apart from the first optical waveguide in a first direction. The first and second optical coupling portions are formed at respective positions where the portions are opposite to each other, or face each other. Furthermore, a side-surface of the first optical coupling portion that is opposite to the second optical coupling portion is larger in line edge roughness than two opposed side-surfaces of a portion of the first optical waveguide, the portion being any portion other than the first optical coupling portion. Additionally, a side-surface of the second optical coupling portion that is opposite to the first optical coupling portion is larger in line edge roughness than two opposed side-surfaces of a portion of the second optical waveguide, the portion being any portion other than the second optical coupling portion.

This aspect makes it possible to realize an optical semiconductor device which can be improved in light shift precision and restrained from undergoing a loss in light transmission.

BRIEF DESCRIPTION OF THE DRAWINGS

FIG. 12 is a plan view of a main portion of a quaternary-in-series-joined ring resonator wavelength filter according to embodiment 3.

DETAILED DESCRIPTION

In the item "DETAILED DESCRIPTION", the present invention is described in the state of being divided into plural sections or embodiments as required for convenience. These are related to each other unless it is clearly stated that these are unrelated to each other. Thus, one of the sections or embodiments may have, for example, such a relation that the one is a varied example of a part or the whole of another thereof, or a detailed or supplement description about a part or the whole of another thereof.

In the case of referring to, in the item, the number of elements, the quantity or size of an element, any property of an element or any other, the number or the like is not limited to any specified numerical value or range thereabout that is described in this item, for example, unless it is clearly stated that the number or the like is limited to a specified numerical value or range, or unless the number or the like is clearly limited to a specified numerical value or range in light of a principle or theory concerned therewith. Thus, the number or the like may be more than or less than the described numerical value or range.

In the item, any described constituent (or step) described is not essential for the present invention, for example, unless the claims recite the constituent or step, or unless the constituent or step is related to a scope equivalent theoretically to the scope of the invention according to the claims.

In the case of using such a wording that an object "includes an A", "is made of an A", "has an A" or "contains an A", of course, the wording does not exclude a meaning that the object contains or has any element other than the A, for example, unless it is clearly stated that the object consists only of an A. Similarly, when in the item the shape of any constituent, a positional relationship between constituents, or any other conception is referred to, the shape or the like may be substantially similar or approximate one, as well as a numerical value or range as described above, for example, unless it is clearly stated that the shape or the like is limited to specified one, or unless the shape or the like is clearly limited to specified one in light of a principle concerned therewith.

Even when any one of drawings referred to in the item is a plan view, hatching may be attached thereto in order to make the plan view easy to view. In all the drawings referred to in the item, the same reference signs are in principle attached, respectively, to members having the same function, and repeated description thereabout is omitted. Hereinafter, with reference to the drawings, embodiments of the present invention will be described in detail.

Embodiment 1

<Structure of Optical Directional Coupler>

Figure 1:
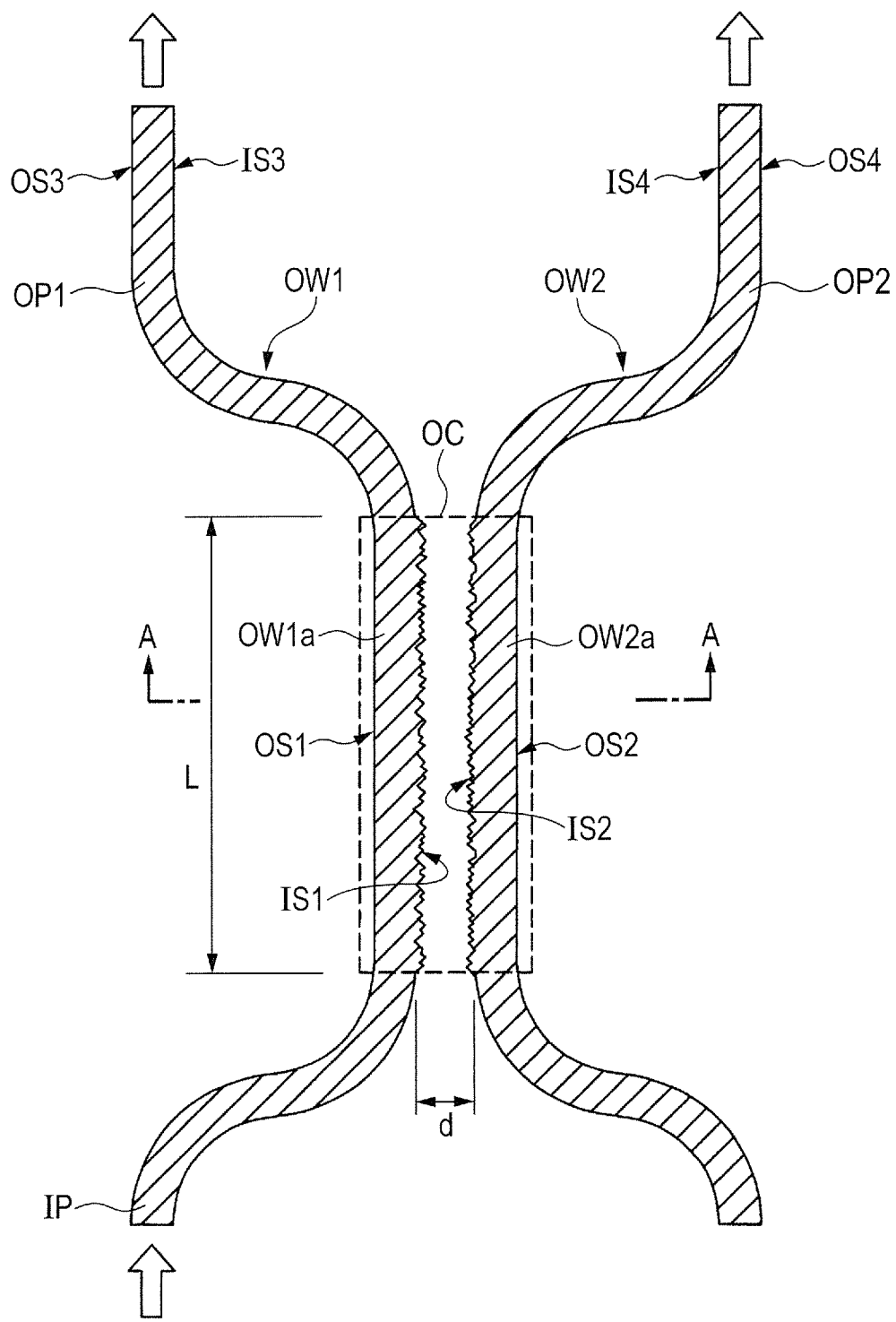
FIG. 1 is a plan view of a main portion of an optical directional coupler according to embodiment 1 of the present invention.
Figure 2:
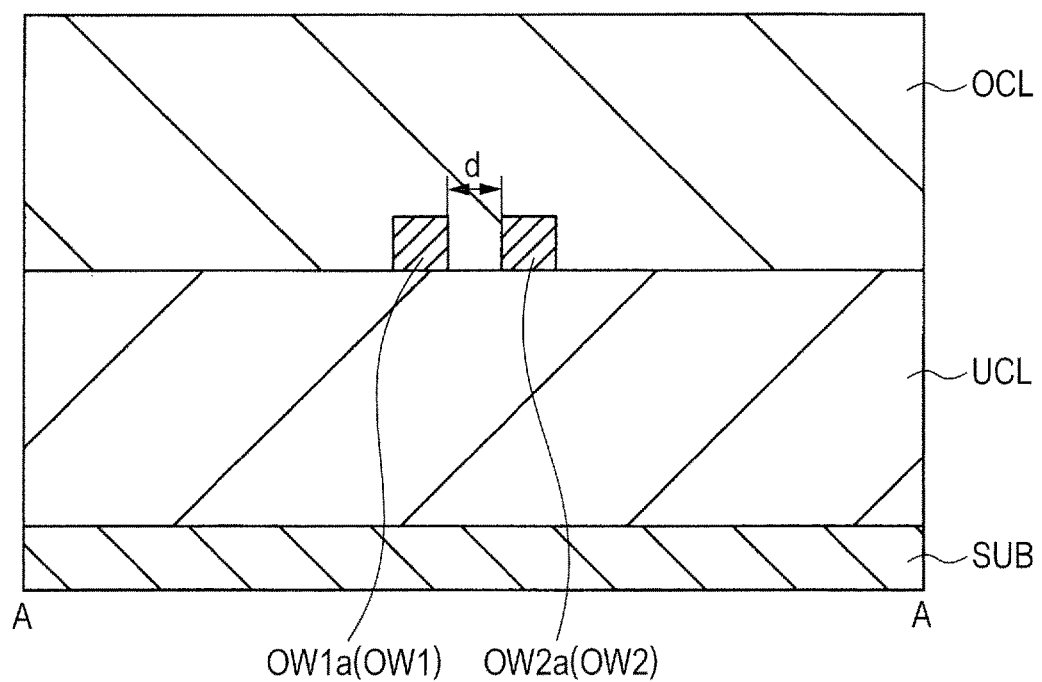
FIG. 2 is a sectional view of the main portion of the optical directional coupler according to embodiment 1 (the section view being taken on line A-A shown in FIG. 1).

With reference to FIGS. 1 and 2, a description will be made about an optical directional coupler according to embodiment 1 of the present invention. FIG. 1 is a plan view of a main portion of the optical directional coupler according to embodiment 1. FIG. 2 is a sectional view of the main portion of the optical directional coupler according to embodiment 1 (the section view being taken on line A-A shown in FIG. 1).

As illustrated in FIGS. 1 and 2, an insulator film (referred to also as a clad layer or underclad layer) UCL made of silicon oxide is formed on a surface of a semiconductor substrate SUB made of monocrystal silicon. The insulator film UCL has a thickness of, for example, about 2 to 3 μm.

Furthermore, a first optical waveguide OW1 (referred to also as a first light-used transmission line, or core) and a second optical waveguide OW2 (referred to also as a second light-used transmission line, or core) are formed on the insulator film UCL, these optical waveguides OW1 and OW2 being made of silicon and being parallel to each other. The thickness and the width of each of the first and second optical waveguides OW1 and OW2 would each be appropriately in a range of, for example, 100 to 500 nm (of course, each of the thickness and the width is not limited into the range in accordance with other conditions). The range would be most preferably a range the central value of which is 300 nm.

When viewed in plan, the first and second optical waveguides OW1 and OW2 are each bent at a substantially central portion thereof to have an optical coupling region OC where these waveguides are closely near to each other over a predetermined length (coupling length L). Specifically, in the optical coupling region OC, a first optical coupling portion OW1a of the first optical waveguide OW1 and a second optical coupling portion OW2a of the second optical waveguide OW2 are located. The coupling length L of the optical coupling region OC would be appropriately in a range of, for example, 1 μm or more (of course, the length L is not limited into the range in accordance with other conditions). The range would be most preferably a range of 10 to 100 μm. The distance d between the first and second optical coupling portions OW1a and OW2a be appropriately in a range of, for example, 100 to 500 μm (of course, the length d is not limited into the range in accordance with other conditions). The range would be most preferably a range the central value of which is 200 nm.

Furthermore, the whole of the front surface of the insulator film UCL plus outer surfaces of the first and second optical waveguides OW1 and OW2 is covered with an interlayer dielectric (referred to also as a clad layer or an overclad layer) OCL. The interlayer dielectric OCL is made of, for example, silicon oxide, and the thickness thereof ranges from, for example, about 2 to 3 μm.

The optical electric field distribution of light advancing in one of the above-mentioned paired optical waveguides, i.e., the first optical waveguide OW1 is an optical electric field distribution spreading to the other optical waveguide, i.e., the second optical waveguide OW2 adjacent to the first optical waveguide OW1 to interpose the interlayer dielectric OCL therebetween. Accordingly, when the light advancing in the first optical waveguide OW1 reaches a start end of the first optical coupling portion OW1a, an even-number symmetric mode (or even mode) and an odd-number symmetric mode (or odd mode) which are equal in electric field amplitude to each other are excited with the same phase in the second optical waveguide OW2. As these two modes are farther transmitted in the optical coupling region OC, a phase difference is more largely generated between the two modes. When the mode-transmitted distance reaches a transmission distance at which this phase difference turns to $\pi$ (in other words, the coupling length L of the optical coupling region OC), the light shifts from the first optical waveguide OW1 to the second optical waveguide OW2.

Thus, a desired optical directional coupler is configured by selecting the distance d between the first and second optical coupling portions OW1a and OW2a, the coupling length L, the refractive index difference (difference in refractive index between the first and second optical waveguides OW1 and OW2, and the interlayer dielectric OCL) in the optical coupling region OC.

For example, when a light ray having a wavelength $\lambda 1$ (for example, 1.31 μm) and a light ray having a wavelength of $\lambda 2$ (for example, 1.55 μm) advance from an input-side port IP of the first optical waveguide OW1, the wavelength-$\lambda 2$ light ray undergoes coupling two times between the first and second optical coupling portions OW1a and OW2a in the optical coupling region OC to be emitted out from a first output-side port OP1 of the first optical waveguide OW1.

Moreover, the wavelength-$\lambda 1$ light ray undergoes coupling one time between the first and second optical coupling portions OW1a and OW2a in the optical coupling region to be emitted out from a second output-side port OP2 of the second optical waveguide OW2.

A side-surface IS1 of the first optical coupling portion OW1a that is opposite to the second optical coupling portion OW2a (hereinafter referred to merely as an inner side-surface of the first optical coupling portion OW1a) is larger in line edge roughness than both side-surfaces IS3 and OS3 of a portion of the first optical waveguide OW1, this portion being any portion other than the first optical coupling portion OW1a (i.e., than the optical coupling region OC). In the same manner, a side-surface IS2 of the second optical coupling portion OW2a that is opposite to the first optical coupling portion OW1a (hereinafter referred to merely as an inner surface of the second optical coupling portion OW2a) is larger in line edge roughness than both side-surfaces IS4 and OS4 of a portion of the second optical waveguide OW2, this portion being any portion other than the second optical coupling portion OW2a (i.e., than the optical coupling region OC).

In other words, the inner side-surface IS1 of the first optical coupling portion OW1a is larger in line edge roughness than not only a side-surface OS1 of the first optical coupling portion OW1a that is not opposite to the second optical coupling portion OW2a (i.e., a side-surface of the first coupling portion OW1a that is reverse to the inner side-surface thereof; hereinafter referred to merely as an outer side-surface of the first optical coupling portion OW1a), but also both the side-surfaces IS3 and OS3 of the above-mentioned portion of the first optical waveguide OW1, this portion being any portion other than the optical coupling region OC. In the same manner, the inner side-surface IS2 of the second optical coupling portion OW2a is larger in line edge roughness than not only a side-surface OS2 of the second optical coupling portion OW2a that is not opposite to the first optical coupling portion OW1a (i.e., a side-surface of the second coupling portion that is reverse to the inner side-surface thereof; hereinafter referred to merely as an outer side-surface of the second optical coupling portion OW2a), but also both the side-surfaces IS4 and OS4 of the above-mentioned portion of the second optical waveguide OW2, this portion being any portion other than the optical coupling region OC.

The line edge roughness of the inner side-surface IS1 of the first optical coupling portion OW1a is from, for example, 6 to 8 nm, as well as that of the inner side-surface IS2 of the second optical coupling portion OW2a. The respective line edge roughnesses of the outer side-surface OS1 of the first optical coupling portion OW1a and the outer side-surface OS2 of the second optical coupling portion OW2a are, for example, 3 nm or less, as well as the respective line edge roughnesses of both the side-surfaces IS3 and OS3 of the above-mentioned portion of the first optical waveguide OW1, the portion being any portion other than the optical coupling region OC, and the respective line edge roughnesses of both the side-surfaces IS4 and OS4 of the above-mentioned portion of the second optical waveguide OW2, the portion being any portion other than the optical coupling region OC.

As described above, in embodiment 1, the inner surface IS1 of the first optical coupling portion OW1a of the optical coupling region OC is made large in line edge roughness, as well as the inner surface IS2 of the second optical coupling portion OW2a of the region OC. Accordingly, antenna effect can make light coupling, that is, light shift easy from the first optical waveguide OW1 to the second optical waveguide OW2. By contrast, the outer side-surface OS1 of the first optical coupling portion OW1a of the optical coupling region OC is made small in line edge roughness, as well as the following surfaces: the outer side-surface OS2 of the second optical coupling portion OW2a of the optical coupling region OC; both the side-surfaces IS3 and OS3 of the above-mentioned portion of the first optical waveguide OW1, the portion being any portion other than the optical coupling region OC; and both the side-surfaces IS4 and OS4 of the above-mentioned portion of the second optical waveguide OW2, the portion being any portion other than the optical coupling region OC. Accordingly, antenna effect is restrained so that a loss in the light transmission can be kept small.

<Modified Example>

In the above-mentioned optical directional coupler, the inner side-surface IS1 of the first optical coupling portion OW1a and the inner side-surface IS2 of the second optical coupling portion OW2a are made large in line edge roughness in the optical coupling region OC. In addition thereto, the outer side-surface OS1 of the first optical coupling portion OW1a and the outer side-surface OS2 of the second optical coupling portion OW2a may be made large in line edge roughness.

Figure 3:
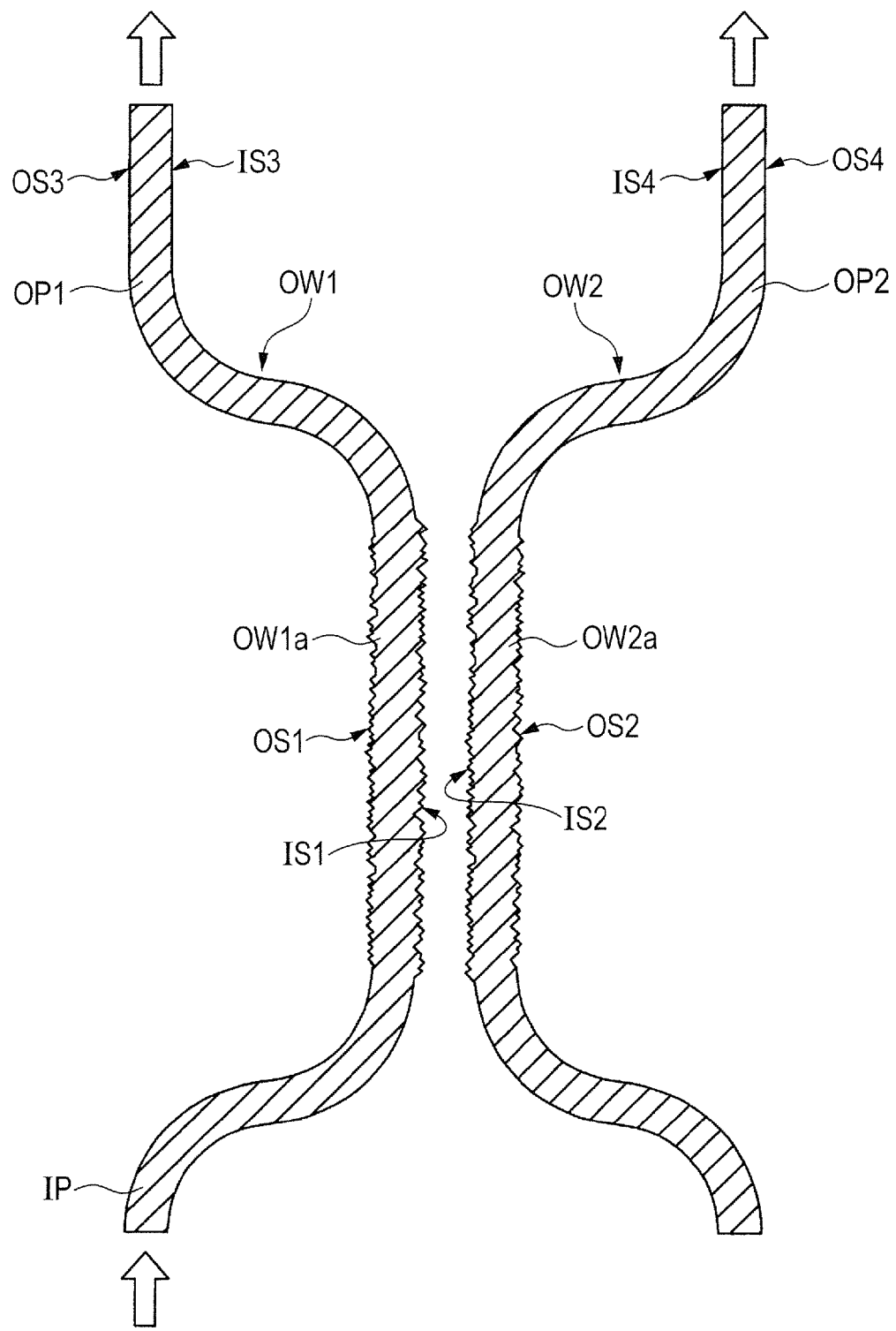
FIG. 3 is a plan view of a main portion of a modified example of the optical directional coupler according to embodiment 1.

FIG. 3 illustrates a plan view of a main portion of a modified example of the optical directional coupler according to embodiment 1.

In this modified example of the optical directional coupler, an inner side-surface IS1 and an outer side-surface OS1 of a first optical coupling portion OW1a of a first optical waveguide OW1 are larger in line edge roughness than both side-surfaces IS3 and OS3 of a portion of the first optical waveguide OW1, the portion being any portion other than the first optical coupling portion OW1a of the first optical waveguide OW1. In the same manner, an inner side-surface IS2 and an outer side-surface OS2 of a second optical coupling portion OW2a of a second optical waveguide OW2 are larger in line edge roughness than both side-surfaces IS4 and OS4 of a portion of the second optical waveguide OW2, the portion being any portion other than the second optical coupling portion OW2a of the second optical waveguide OW2.

By making the predetermined surfaces large in line edge roughness in this way, the workpiece of the optical directional coupler is easily worked, the predetermined surfaces being the inner side-surface IS1 and the outer side-surface OS1 of the first optical coupling portion OW1a , and the inner side-surface IS2 and the outer side-surface OS2 of the second optical coupling portion OW2a. Additionally, antenna effect is further generated so that light coupling, that is, light shift can be made easy from the first optical waveguide OW1 to the second optical waveguide OW2.

<Method for Producing Optical Directional Coupler>

With reference to FIGS. 4 to 7, a description will be made about a method for producing the optical directional coupler according to embodiment 1 along steps thereof. FIGS. 4A, 5A, 6A and 7A are respective sectional views of a main portion of an optical directional coupler workpiece in a process of processing the coupler (the sectional views being taken on line B-B in FIGS. 4B, 5B, 6B and 7B, respectively). FIGS. 4B, 5B, 6B and 7B are each a plan view of the main portion of the optical directional coupler workpiece in the processing process.

Figure 4A:
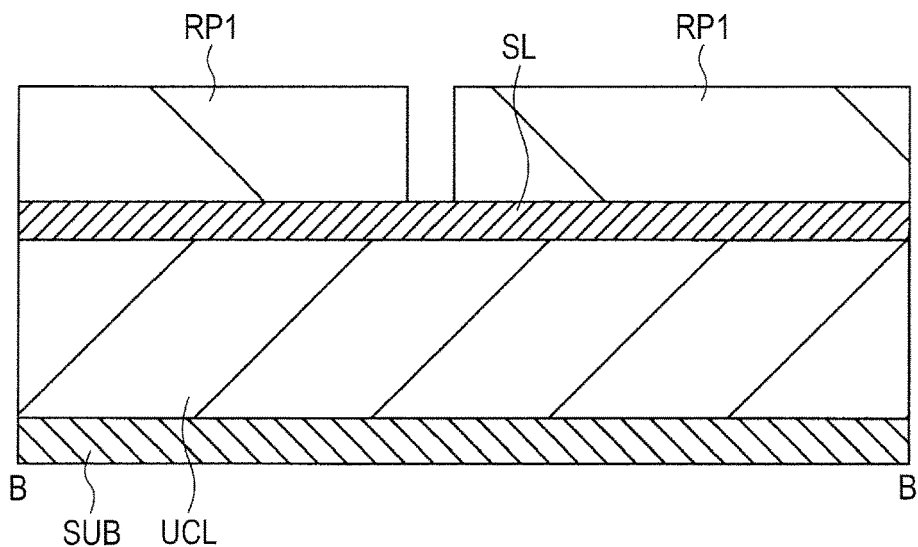
FIGS. 4A and 4B are a sectional view and a plan view of a main portion of an optical directional coupler workpiece, respectively, these views illustrating a step in a process for producing the optical directional coupler according to embodiment 1.
Figure 4B:
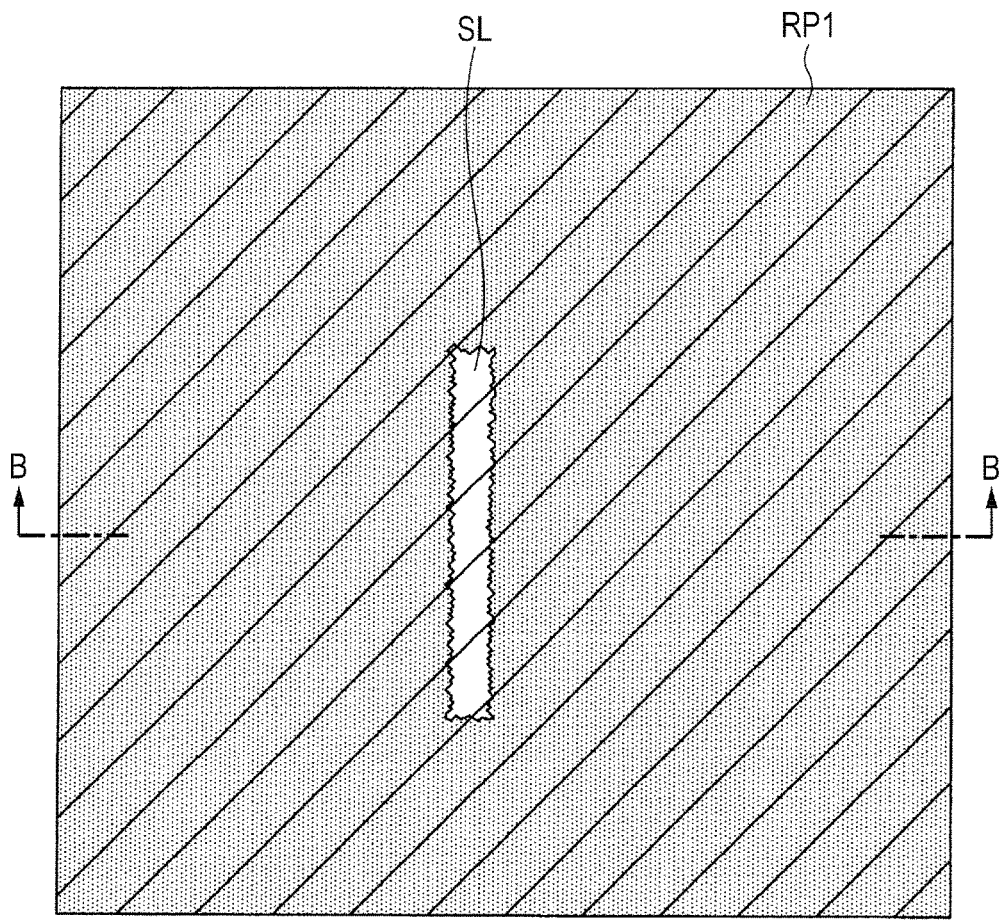

Firstly, as illustrated in FIGS. 4A and 4B, prepared is a silicon-on-insulator (SOI) substrate made of a semiconductor substrate SUB, an insulator film UCL laminated on a main surface of the semiconductor substrate SUB, and a semiconductor layer SL formed on the insulator film UCL. The semiconductor substrate SUB is a supporting substrate made of monocrystal silicon. The insulator film UCL is made of silicon oxide, and the semiconductor layer SL is made of silicon. The thickness of the insulator film UCL is from, for example, about 2 to 3 μm, and that of the semiconductor layer SL is, for example, 300 nm.

The SOI substrate may be formed by, for example, a silicon implanted oxide (SIMOX) method or a joining method. In the SIMOX method, generally, ions of oxygen are implanted into a main surface of a semiconductor substrate made of silicon, and subsequently the workpiece is annealed to bond silicon and oxygen to each other, thereby forming an insulator film at positions of the semiconductor substrate that are slightly lower than the main surface. Using this method, the above-mentioned SOI substrate is formed. In the joining method, generally, high heat and pressure are applied to a semiconductor substrate made of silicon and having an upper surface on which an insulator film is formed, and another semiconductor substrate made of silicon, so as to be bonded to each other, thereby joining the substrates to each other, and subsequently one of the semiconductor substrates is polished to make the workpiece into a thin film form. Using this method, the SOI substrate is formed.

Next, a photoresist is applied onto the semiconductor layer SL. The workpiece is subjected to dry exposure using an ArF excimer laser (wavelength: 193 nm), or dry exposure using a KrF excimer laser (wavelength: 248 nm), and subsequently subjected to developing treatment to pattern the photoresist.

At this time, patterned moieties of the photoresist are moieties thereof that correspond to moieties of the semiconductor layer SL that are desired to be increased in line edge roughness. Specifically, the following is formed: a resist mask RP1 used for working moieties of the workpiece that correspond to the inner side-surface IS1 of the first optical coupling portion OW1a, and the inner side-surface IS2 of the second optical coupling portion OW2a, which have each been illustrated in FIG. 1.

About the resolution power of the exposure apparatus, the resolution power is higher as the wavelength of the light source is shorter or the numerical aperture NA of the projection lens (the brightness of the projection lens) is larger, as shown in the following expression (1):

Resolution power=$k \times \lambda / NA$  Expression (1)

wherein k represents the process coefficient, λ represents the wavelength of the illumination light, and NA=$n \times \sin \theta$  Expression (2).

In the expression (2), n represents the refractive index of a medium through which the exposure light passes (and is 1 in the case of air), and θ represents a maximum incident angle of the exposure light. Accordingly, when the refractive index is 1, the value NA is theoretically at highest less than 1.0. In the case of, for example, dry exposure using an ArF excimer laser as the light source, the resolution power is approximately 65 nm.

Figure 5A:
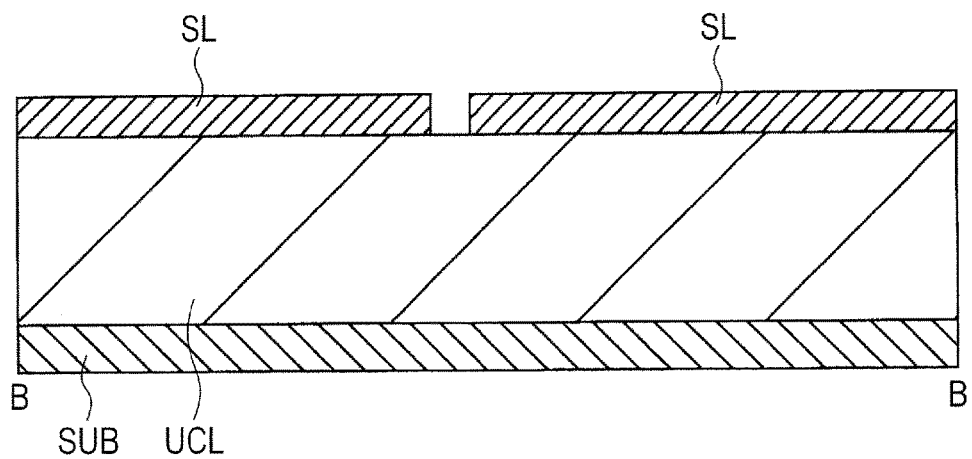
FIGS. 5A and 5B are a sectional view and a plan view of a main portion of an optical directional coupler workpiece, respectively, these views illustrating a step after the step in FIG. 4 in the process.
Figure 5B:
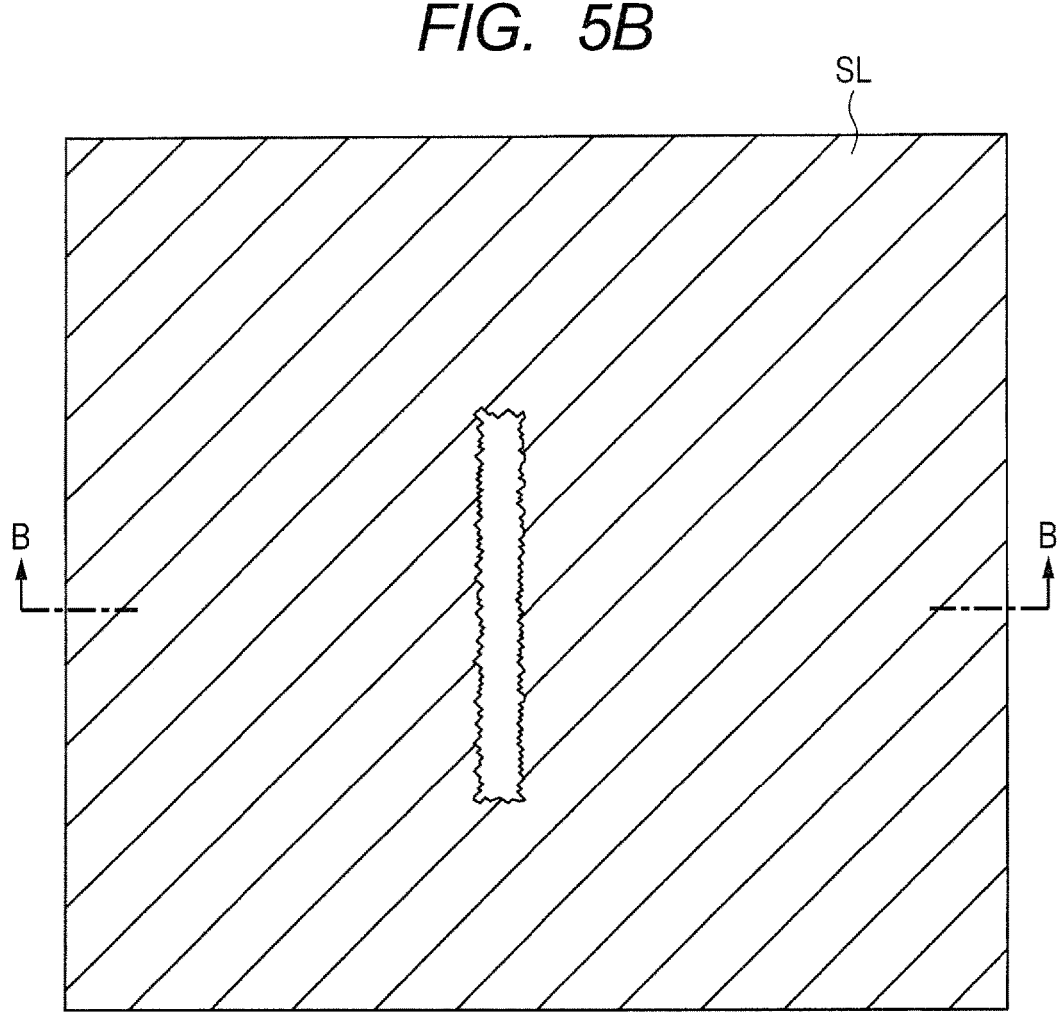

Next, as illustrated in FIGS. 5A and 5B, the resist mask RP1 is used as an etching mask to work the semiconductor layer SL by dry etching. In this way, moieties of the semiconductor layer SL that are desired to be increased in line edge roughness are etched. Specifically, the following are formed: moieties of this layer that correspond to the inner side-surface IS1 of the first optical coupling portion OW1a, and the inner side-surface IS2 of the second optical coupling portion OW2a, which have each been illustrated in FIG. 1.

Figure 6A:
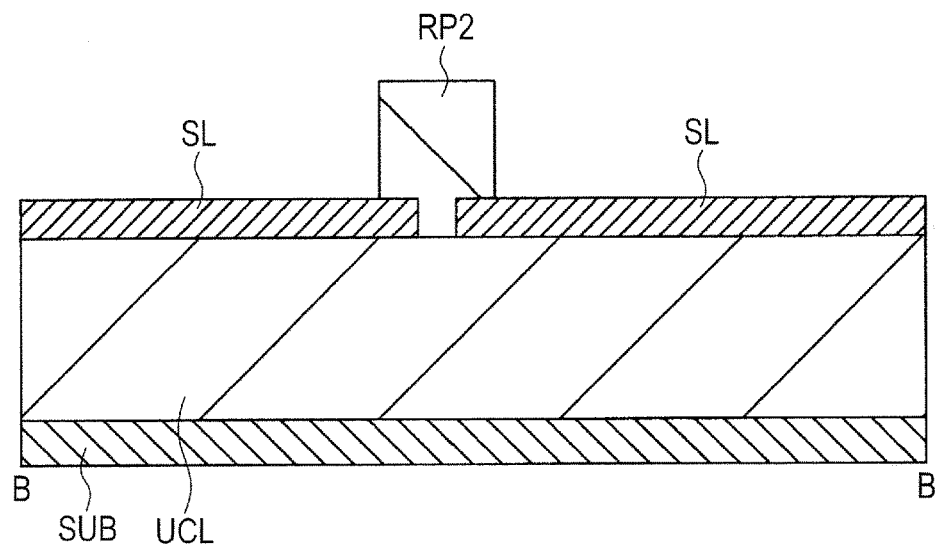
FIGS. 6A and 6B are a sectional view and a plan view of a main portion of an optical directional coupler workpiece, respectively, these views illustrating a step after the step in FIG. 5 in the process.
Figure 6B:
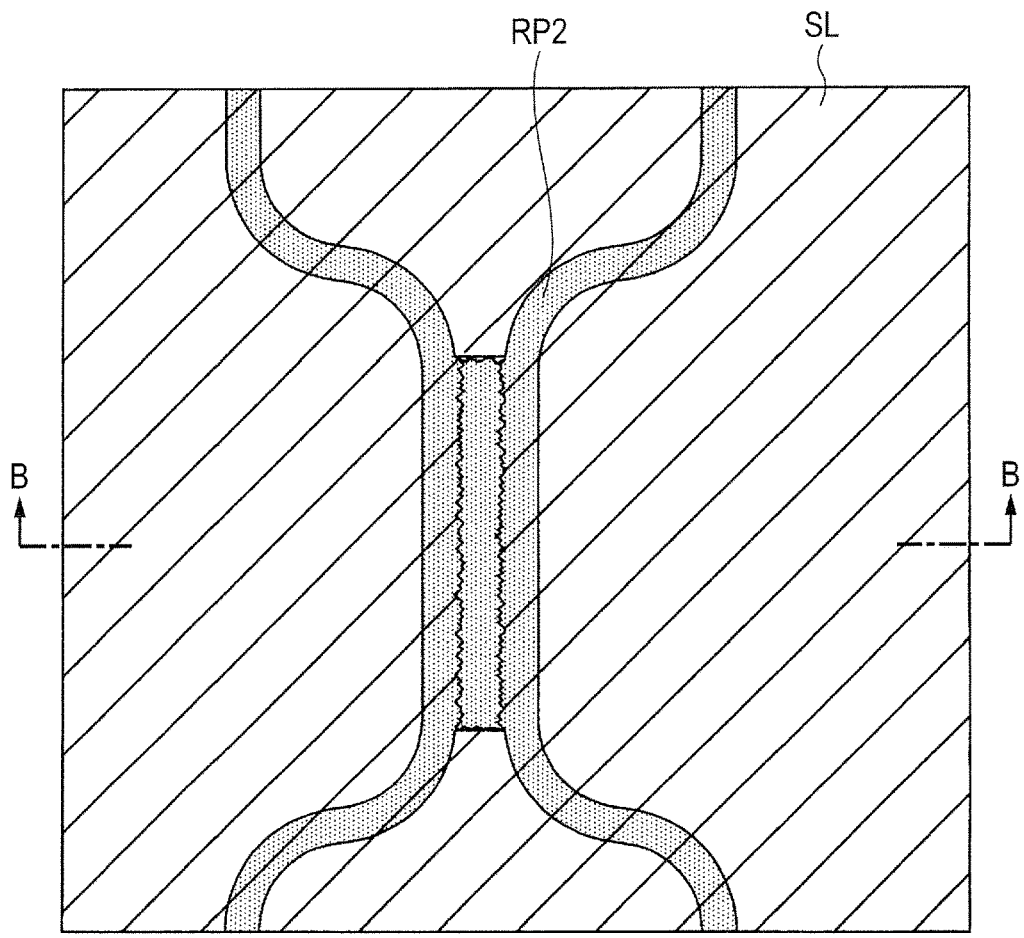

Next, as illustrated in FIGS. 6A and 6B, a photoresist is applied onto the semiconductor layer SL. The workpiece is subjected to liquid-immersion exposure using an ArF excimer laser (wavelength: 193 nm), and subsequently subjected to developing treatment to pattern the photoresist.

At this time, patterned moieties of the photoresist are moieties thereof that correspond to moieties of the semiconductor layer SL that are desired to be decreased in line edge roughness. Specifically, the following is formed: a resist mask RP2 used for working moieties of the workpiece that correspond to any portion of the first optical coupling portion OW1a that is other than the inner side-surface IS1 of the portion OW1a, and any portion of the second optical coupling portion OW2a that is other than the inner side-surface IS2 of the portion OW2a, which have each been illustrated in FIG. 1.

The resolution power of the exposure apparatus depends on the refractive index n of a medium through which the exposure light passes, as shown in the equations (1) and (2). In the liquid-immersion exposure, the medium through which the exposure light passes is not air but pure water, which has a refractive index of 1.44. In the liquid-immersion exposure, therefore, the value NA can be theoretically increased 1.44 times the value NA in dry exposure, so that a resolution power of about 40 to 45 nm can be obtained.

Figure 7A:
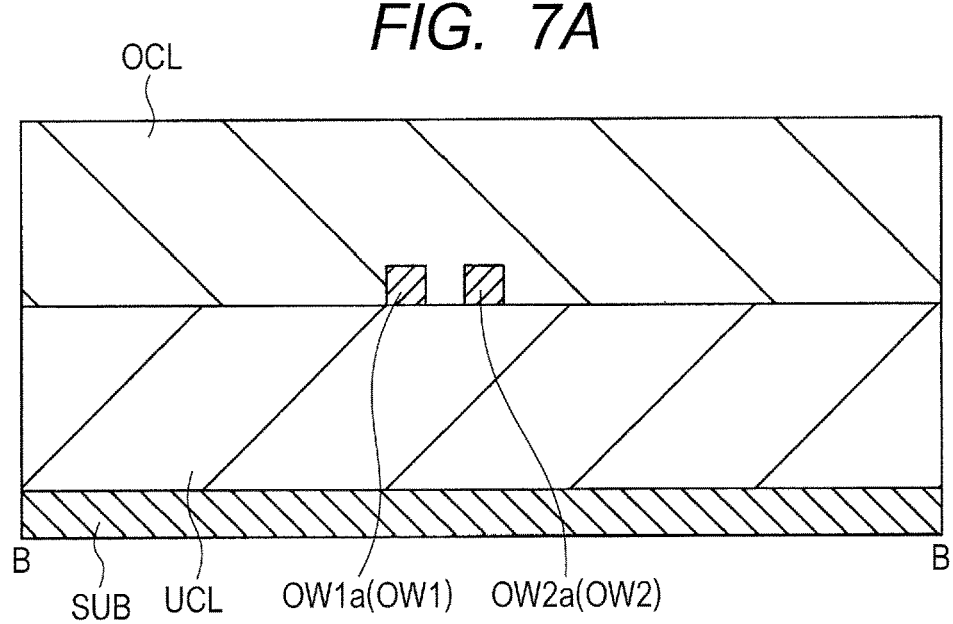
FIGS. 7A and 7B are a sectional view and a plan view of a main portion of an optical directional coupler workpiece, respectively, these views illustrating a step after the step in FIG. 6 in the process.
Figure 7B:
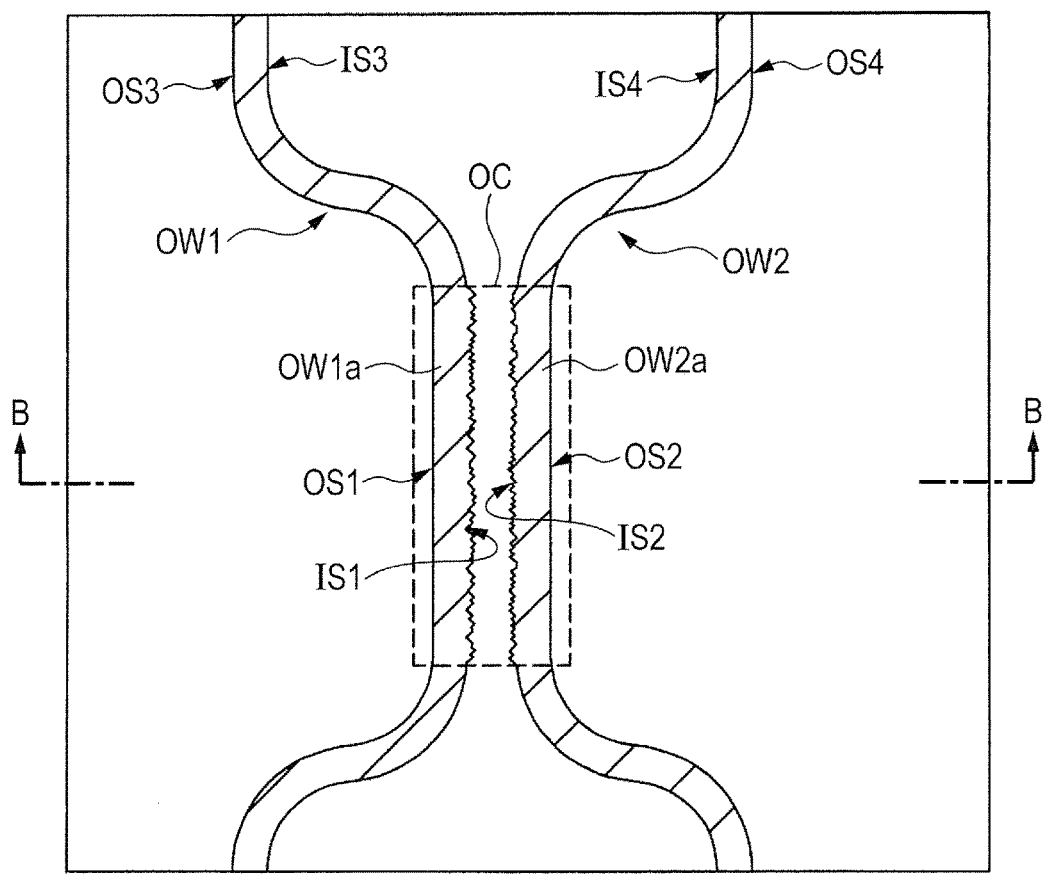

Next, as illustrated in FIGS. 7A and 7B, the resist mask RP2 is used as an etching mask to work the semiconductor layer SL by dry etching. In this way, moieties of the semiconductor layer SL which are desired to be decreased in line edge roughness are etched. Specifically, the following are formed: moieties of the workpiece that correspond to any portion of the first optical coupling portion OW1a that is other than the inner side-surface IS1 of this portion OW1a, which has been illustrated in FIG. 1, (i.e., the outer side-surface OS1 of the first optical coupling portion OW1a of the optical coupling region OC; and both the side-surfaces IS3 and OS3 of the above-mentioned portion of the first optical waveguide OW1, this portion being any other than the optical coupling region OC in FIG. 1), and moieties of the workpiece that correspond to any portion of the second optical coupling portion OW2a that is other than the inner side-surface IS2 of this portion OW2a, which has been illustrated in FIG. 1, (i.e., the outer side-surface OS2 of the second optical coupling portion OW2a of the optical coupling region OC; and both the side-surfaces IS4 and OS4 of the above-mentioned portion of the second optical waveguide OW2, this portion being any other than the optical coupling region OC in FIG. 1). Thereafter, the resist mask RP2 is removed.

Through this producing process, a first optical waveguide OW1 and a second optical waveguide OW2 are formed on the insulator film UCL. Specifically, in an optical coupling region OC of the workpiece, the following are formed: a first optical coupling portion OW1a having an inner side-surface IS1 large in line edge roughness, and an outer side-surface OS1 small in line edge roughness; and a second optical coupling portion OW2a having an inner side-surface IS2 large in line edge roughness, and an outer side-surface OS2 small in line edge roughness; furthermore, in any portion of the workpiece other than the optical coupling region OC, the following are formed: a first optical waveguide OW1 portion having both side-surfaces IS3 and OS3 small in line edge roughness; and a second optical waveguide OW2 portion having both side-surfaces IS4 and OS4 small in line edge roughness.

Thereafter, the whole of the outer surface of the insulator film UCL plus outer surfaces of the first and second optical waveguides OW1 and OW2 is covered with an interlayer dielectric OCL made of, for example, silicon oxide. The thickness of the interlayer dielectric OCL is from, for example, about 2 to 3 µm. In this way, the optical directional coupler of embodiment 1 is substantially completed.

In embodiment 1, as has been illustrated in FIGS. 4 and 5, the following side-surfaces large in line edge roughness are firstly formed: the inner side-surface IS1 of the first optical coupling portion OW1a of the optical coupling region OC, and the inner side-surface IS2 of the second optical coupling portion OW2a of the region OC. Thereafter, as has been illustrated in FIGS. 6 and 7, the following surfaces small in line edge roughness are formed: the outer side-surface OS1 of the first optical coupling portion OW1a of the optical coupling region OC, and the outer side-surface OS2 of the second optical coupling portion OW2a of the region OC; and both the side-surfaces IS3 and OS3 of the above-mentioned portion of the first optical waveguide OW1, this portion being any portion other than the optical coupling region OC, and both the side-surfaces IS4 and OS4 of the above-mentioned portion of the second optical waveguide OW2, this portion being any portion other than the optical coupling region OC. However, the method for producing the optical directional coupler is not limited into the method described hereinbefore. For example, the following producing method may be used: First, the following surfaces small in line edge roughness are formed: the outer side-surface OS1 of the first optical coupling portion OW1a of the optical coupling region OC, and the outer side-surface OS2 of the second optical coupling portion OW2a of the region OC; and both the side-surfaces IS3 and OS3 of the above-mentioned portion of the first optical waveguide OW1, this portion being any portion other than the optical coupling region OC, and both the side-surfaces IS4 and OS4 of the above-mentioned portion of the second optical waveguide OW2, this portion being any portion other than the optical coupling region OC. Thereafter, the following side-surfaces large in line edge roughness are formed: the inner side-surface IS1 of the first optical coupling portion OW1a of the optical coupling region OC, and the inner side-surface IS2 of the second optical coupling portion OW2a of the region OC.

As described above, according to embodiment 1, in the optical coupling region OC of the optical directional coupler, the inner surface IS1 of the first optical coupling portion OW1a of the optical coupling region OC is made large in line edge roughness, as well as the inner surface IS2 of the second optical coupling portion OW2a of the region OC. Accordingly, antenna effect can make light coupling, that is, light shift easy from the first optical waveguide OW1 to the second optical waveguide OW2. By contrast, the outer side-surface OS1 of the first optical coupling portion OW1a of the optical coupling region OC is made small in line edge roughness, as well as the following surfaces: the outer side-surface OS2 of the second optical coupling portion OW2a of the optical coupling region OC; both the side-surfaces IS3 and OS3 of the above-mentioned portion of the first optical waveguide OW1, the portion being any portion other than the optical coupling region OC; and both the side-surfaces IS4 and OS4 of the above-mentioned portion of the second optical waveguide OW2, the portion being any portion other than the optical coupling region OC. Accord-ingly, antenna effect is restrained so that a loss in the light transmission can be kept small.

This embodiment makes it possible to realize an optical directional coupler that can be improved in light shift precision and restrained from undergoing a loss in light transmission.

Embodiment 2:

An optical directional coupler according to embodiment 2 is substantially identical in structure with the optical directional coupler of the above-mentioned embodiment, i.e., embodiment 1. However, in embodiment 2, a manner for producing its first and second optical waveguides is different from the corresponding manner in embodiment 1.

<Method for Producing Optical Directional Coupler>

Figure 8A:
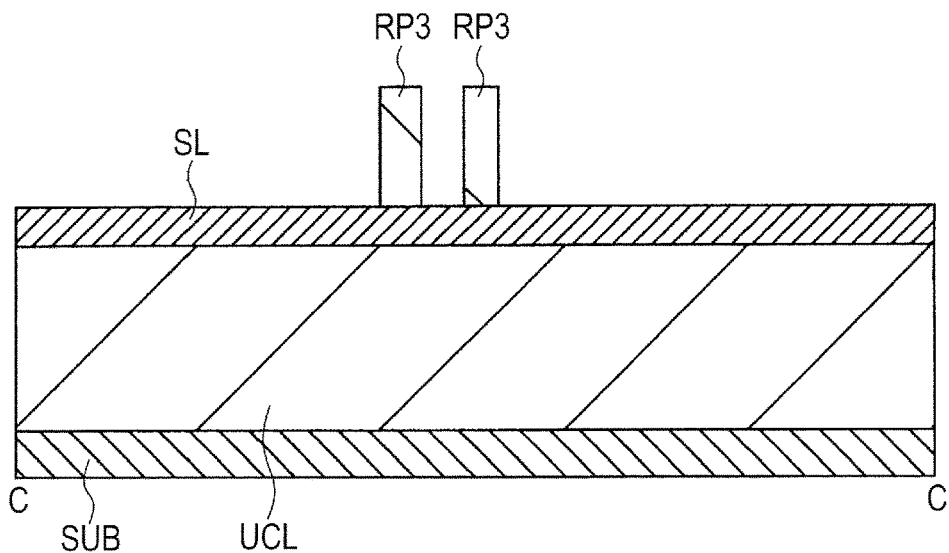
FIGS. 8A and 8B are a sectional view and a plan view of a main portion of an optical directional coupler workpiece, respectively, these views illustrating a step in a process for producing an optical directional coupler according to embodiment 2 of the present invention.
Figure 8B:
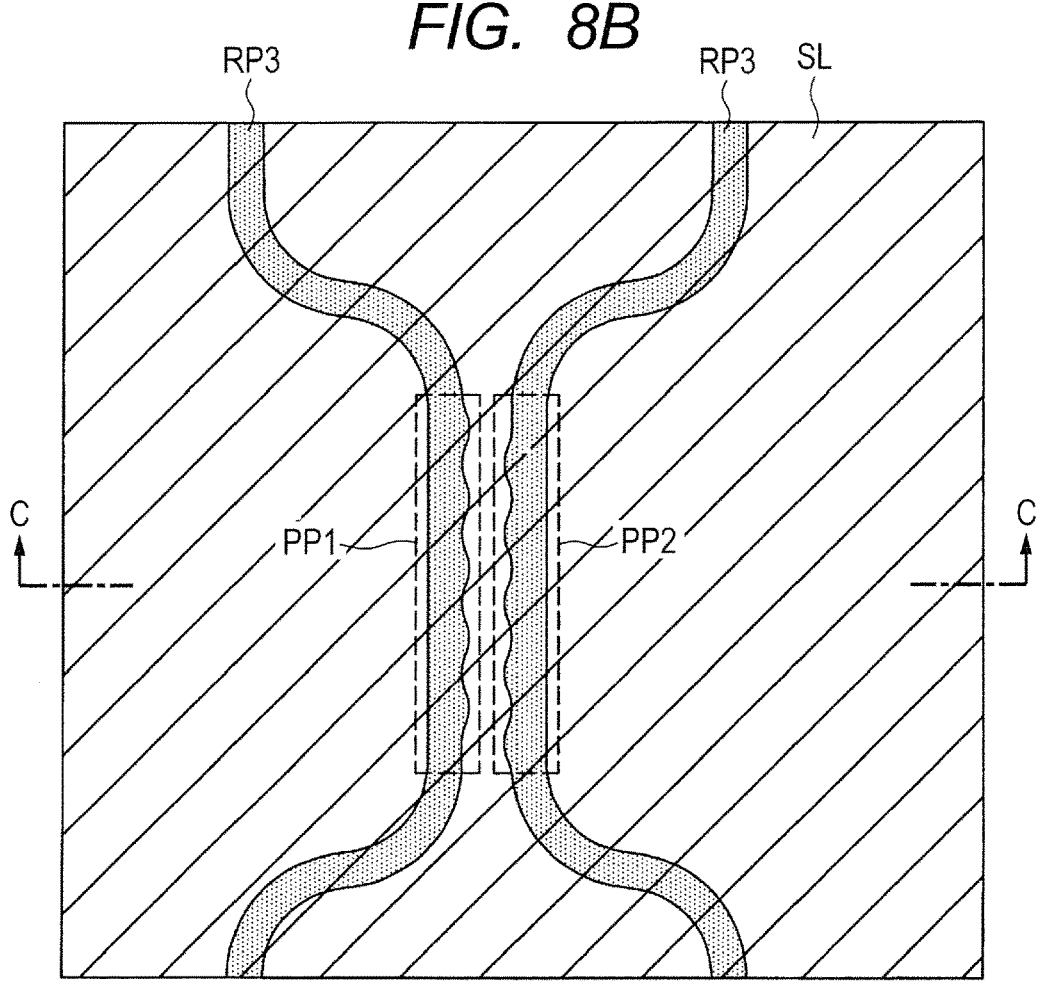
Figure 9:
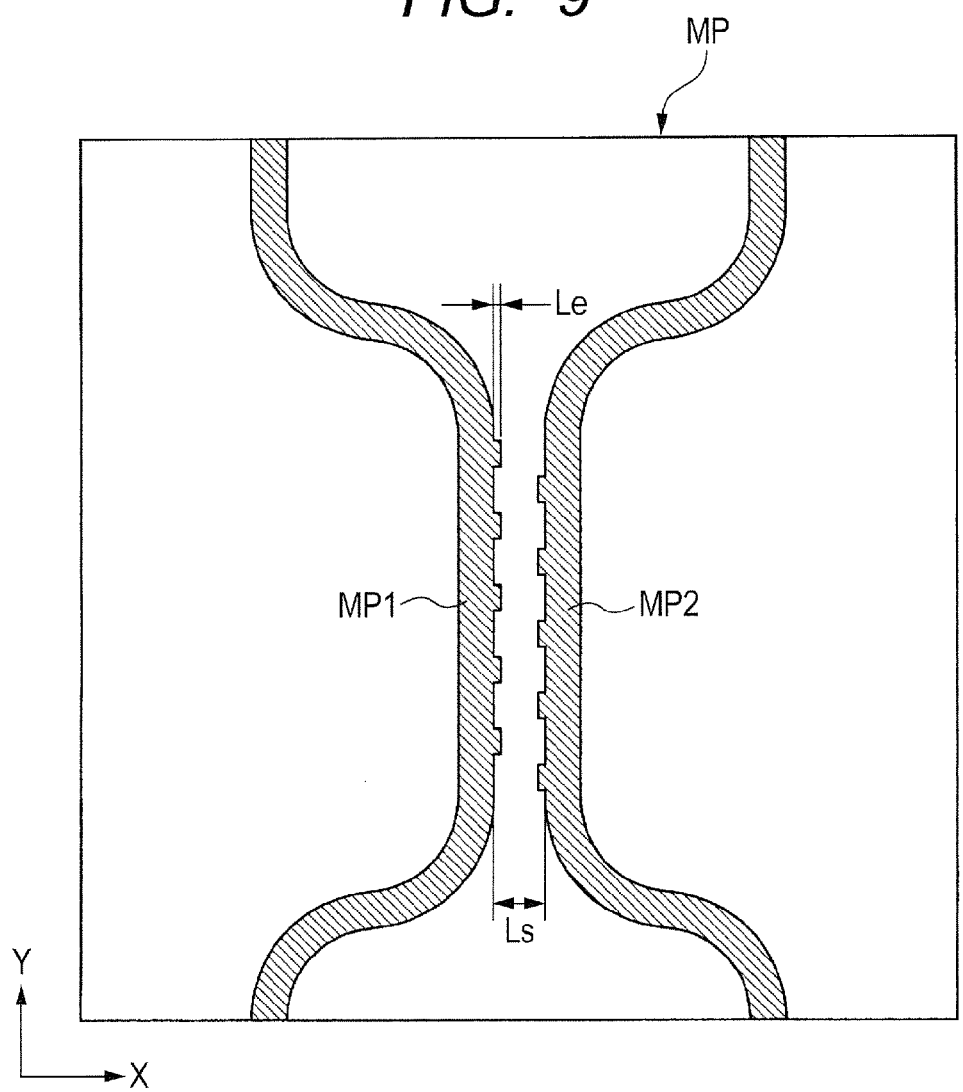
FIG. 9 is a plan view illustrating a main portion of a mask pattern of a photomask used to form optical waveguides according to embodiment 2.
Figure 10A:
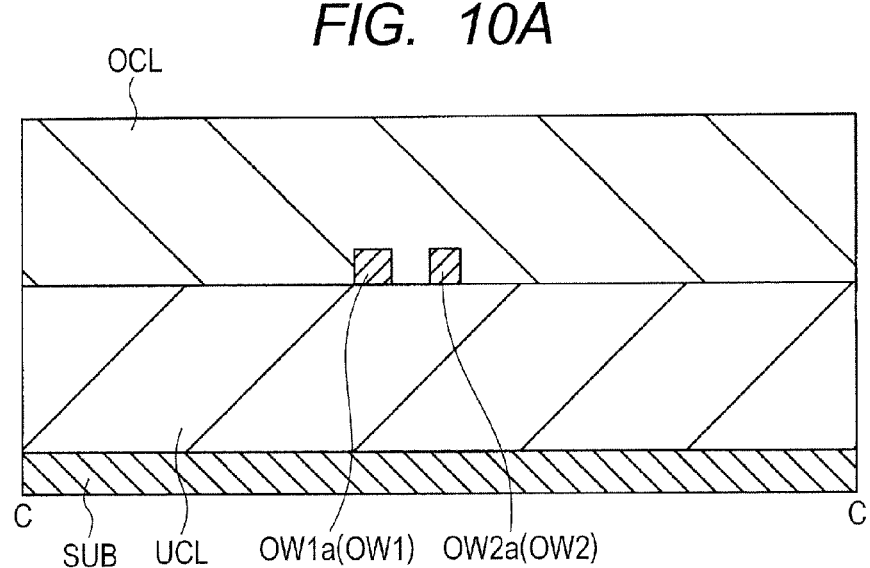
FIGS. 10A and 10B are a sectional view and a plan view of a main portion of an optical directional coupler workpiece, respectively, these views illustrating a step after the step in FIG. 8 in the process for embodiment 2.
Figure 10B:
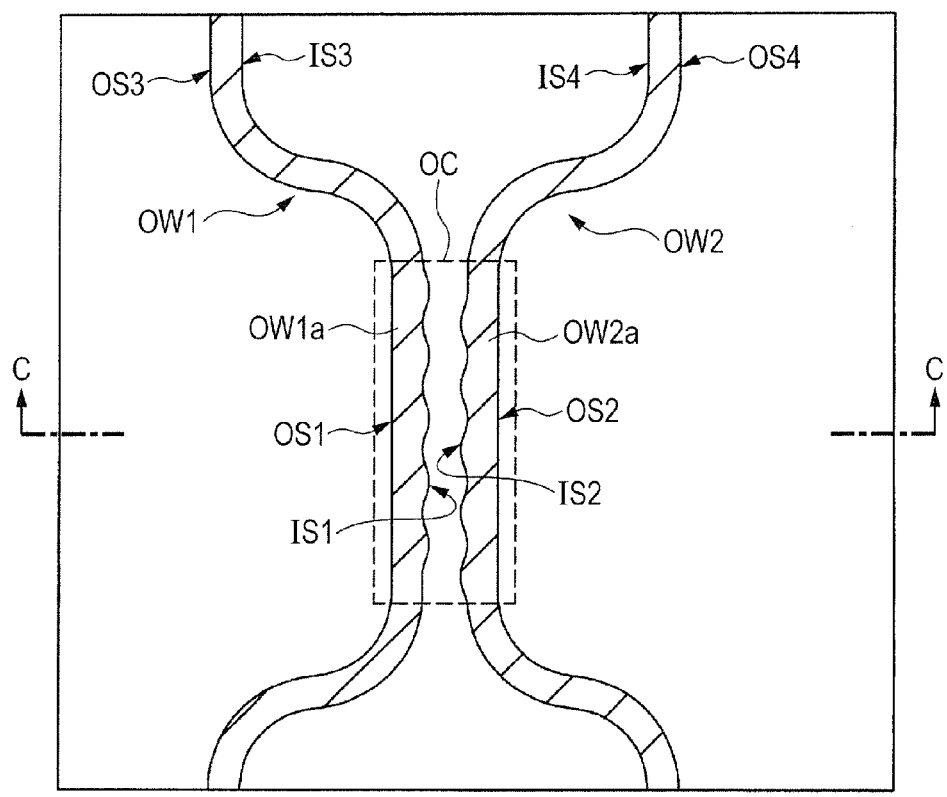

With reference to FIGS. 8 to 10, a description will be made about a method for producing the optical directional coupler according to embodiment 2 along steps thereof. FIG. 8A and FIG. 10A are respective sectional views of a main portion of an optical directional coupler workpiece in a process of processing the coupler (the sectional views being taken on line C-C in FIGS. 8B and 10B, respectively). FIGS. 8B and 10B are each a plan view of the main portion of the optical directional coupler workpiece in the processing process (about FIG. 9, see below).

Firstly, as illustrated in FIGS. 8A and 8B, prepared is an SOI substrate made of a semiconductor substrate SUB, an insulator film UCL laminated on a main surface of the semiconductor substrate SUB, and a semiconductor layer SL formed on the insulator film UCL. The semiconductor substrate SUB is a supporting substrate made of monocrystal silicon. The insulator film UCL is made of silicon oxide, and the semiconductor layer SL is made of silicon. The thickness of the insulator film UCL is from, for example, about 2 to 3 µm, and that of the semiconductor layer SL is, for example, 300 nm.

Next, a photoresist is applied onto the semiconductor layer SL. The workpiece is subjected to liquid-immersion exposure using an ArF excimer laser (wavelength: 193 nm), and subsequently subjected to developing treatment to pattern the photoresist. In this case, the liquid-immersion exposure is performed. However, dry exposure maybe performed which makes use of an ArF excimer laser (wavelength: 193 nm) or a KrF excimer laser (wavelength: 248 nm).

A plan view of FIG. 9 illustrates an example of a mask pattern MP drawn in an outer surface of a photomask used in this photolithographic step. Plural projections (referred to also as step portions, convex portions or projected portions) are formed only in moieties of the mask pattern MP that correspond to the semiconductor layer SL that are desired to be increased in line edge roughness, that is, only in the inside of a first optical coupling portion mask pattern MP1 which corresponds to the inner side-surface IS1 of the first optical coupling portion OW1a illustrated in FIG. 1, and the inside of a second optical coupling portion mask pattern MP2 which corresponds to the inner side-surface IS2 of the second optical coupling portion OW2a illustrated in FIG. 1.

Specifically, the first optical coupling portion mask pattern MP1 and the second optical coupling portion mask pattern MP2 that are extended to a second direction (direction y in FIG. 9) are adjacent to each other to have a distance Ls in a first direction (direction x in FIG. 9) orthogonal to the second direction. In a side-surface of the first optical coupling portion mask pattern MP1, this side-surface being a side-surface nearer to the second optical coupling portion mask pattern MP2, some of the above-mentioned projections, which are projected towards the second optical coupling portion mask pattern MP2, are arranged in the second direction to have predetermined intervals. In the same manner, in a side-surface of the second optical coupling portion mask pattern MP2, this side-surface being a side-surface nearer to the first optical coupling portion mask pattern MP1, the other of the projections, which are projected towards the first optical coupling portion mask pattern MP1, are arranged in the second direction to have predetermined intervals. Furthermore, the projections of the first optical coupling portion mask pattern MP1 and those of the second optical coupling portion mask pattern MP2 are arranged alternately in the second direction not to oppose the projections of the first optical coupling portion mask pattern MP1 to those of the second optical coupling portion mask pattern MP2.

The length Le of the projections of the first optical coupling portion mask pattern MP1 and the second optical coupling portion mask pattern MP2 would appropriately in a range of, for example, 20 to 50 nm (of course, the length is not limited into the range in accordance with other conditions). The range would be most preferably a range the central value of which is 30 nm.

Using the mask pattern MP, the workpiece is exposed to light, and subsequently subjected to developing treatment to pattern the photoresist. An example of a pattern of the resist mask used in this photolithographic step is shown in FIG. 8B. Irregularities having rounded tops and valleys are formed only in moieties of the mask pattern MP that correspond to moieties of the semiconductor layer SL that are desired to be increased in line edge roughness, i.e., only in the inside of a first optical coupling portion resist pattern PP1 that corresponds to the inner side-surface IS1 of the first optical coupling portion OW1a, which has been illustrated in FIG. 1, and the inside of a second optical coupling portion resist pattern PP2 that corresponds to the inner side-surface IS2 of the second optical coupling portion OW2a, which has been illustrated in FIG. 1.

Next, as illustrated in FIGS. 10A and 10B, the semiconductor layer SL is worked by drying etching, using a resist mask RP3 as an etching mask. In this way, the moieties of the semiconductor layer SL that are desired to be increased in line edge roughness are etched. Specifically, the following are etched: moieties of the workpiece that correspond to the inner side-surface IS1 of the first optical coupling portion OW1a, and the inner side-surface IS2 of the second optical coupling portion OW2a, which have been illustrated in FIG. 1. Simultaneously, moieties of the semiconductor layer SL that are desired to be decreased in line edge roughness are etched. Specifically, the following are formed: moieties of the workpiece that correspond to any portion of the first optical coupling portion OW1a that is other than the inner side-surface IS1 of this portion OW1a, which has been illustrated in FIG. 1, (i.e., the outer side-surface OS1 of the first optical coupling portion OW1a of the optical coupling region OC, and both the side-surfaces IS3 and OS3 of the above-mentioned portion of the first optical waveguide OW1, this portion being any other than the optical coupling region OC in FIG. 1), and moieties of the workpiece that correspond to any portion of the second optical coupling portion OW2a that is other than the inner side-surface IS2 of this portion OW2a, which has been illustrated in FIG. 1, (i.e., the outer side-surface OS2 of the second optical coupling portion OW2a of the optical coupling region OC, and both the side-surfaces IS4 and OS4 of the above-mentioned portion of the second optical waveguide OW2, this portion being any other than the optical coupling region OC in FIG. 1). Thereafter, the resist mask RP3 is removed.

Through this producing process, a first optical waveguide OW1 and a second optical waveguide OW2 are formed on the insulator film UCL. Specifically, in the same manner as in embodiment 1, in an optical coupling region OC of the workpiece, the following are formed: a first optical coupling portion OW1a having an inner side-surface IS1 large in line edge roughness, and an outer side-surface OS1 small in line edge roughness; and a second optical coupling portion OW2a having an inner side-surface IS2 large in line edge roughness, and an outer side-surface OS2 small in line edge roughness. Furthermore, in any portion of the workpiece that is other than the optical coupling region OC, the following are formed: a first optical waveguide OW1 portion having both side-surfaces IS3 and OS3 small in line edge roughness; and a second optical waveguide OW2 portion having both side-surfaces IS4 and OS4 small in line edge roughness.

Thereafter, the whole of the outer surface of the insulator film UCL plus outer surfaces of the first and second optical waveguides OW1 and OW2 is covered with an interlayer dielectric OCL made of, for example, silicon oxide. The thickness of the interlayer dielectric OCL is from, for example, about 2 to 3 μm. In this way, the optical directional coupler of embodiment 2 is substantially completed.

As described above, according to embodiment 2, the same advantageous effects as in embodiment 1 are produced. Furthermore, the number of the photolithographic steps, and that of the dry etching steps can each be reduced by one, as compared with that in embodiment 1. This matter makes it possible to decrease the optical directional coupler in production costs and production TAT.

Figure 11:
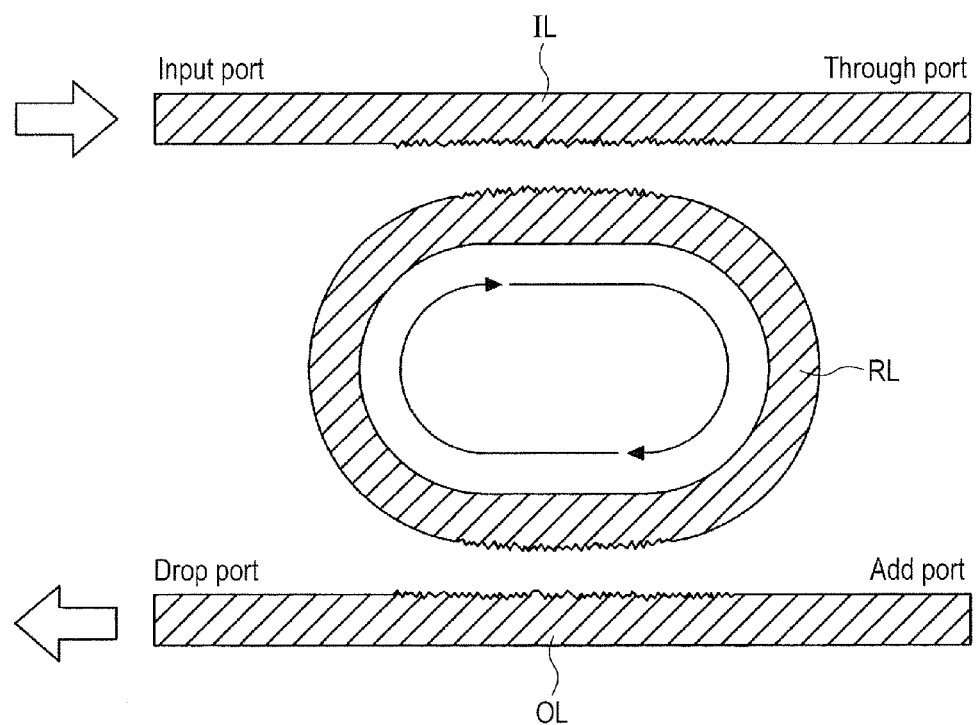
FIG. 11 is a plan view of a main portion of a single ring resonator wavelength filter according to embodiment 3 of the present invention.

Embodiment 3:

In each of embodiments 1 and 2, the description has been made about an optical directional coupler in which two optical coupling portions are arranged in parallel to each other to have a predetermined interval. In embodiment 3, however, a description will be made about an optical waveguide type wavelength filter to which plural optical coupling portions are applied. FIG. 11 is a plan view of a main portion of an example of the filter according to embodiment 3, which is a single ring resonator wavelength filter. FIG. 12 is a plan view of a main portion of another example of the filter according to embodiment 3, which is a quaternary-in-series-joined ring resonator wavelength filter, in which ring four resonators are joined to each other in series.

The single ring resonator wavelength filter illustrated in FIG. 11 is an example of an optical waveguide type wavelength filter in which only optical signals each having a specified wavelength are shifted to each of its optical waveguides to make add/drop operations. This filter has a single ring resonator RL between the optical waveguides, which are an input-side optical waveguide IL and an output-side optical waveguide OL. The add operation denotes an operation of adding an optical sing having any wavelength to a bus line; the drop operation, an operation of taking out an optical sing having any wavelength to the bus line.

When viewed in plan, the ring resonator RL has a ring-form shape surrounded by an external shape and an internal shape, and is arranged between the input-side optical waveguide IL and the output-side optical waveguide OL.

In the single ring resonator wavelength filter, the ring resonator RL functions as optical coupling portions between the input-side optical waveguide IL and the output-side optical waveguide OL. In other words, a portion between the input-side optical waveguide IL and the ring resonator RL, and a portion between the output-side optical waveguide OL and the ring resonator RL can each be regarded as an optical coupling portion; and the inside of the ring resonator RL can be regarded as a phase change portion.

Specifically, when wavelength multiplexed optical signals are input into an input port of the input-side optical waveguide IL, only optical signals each having a wavelength consistent with any resonant wavelength of the ring resonator RL, out of the entire signals, are transmitted through the ring resonator RL into the output-side optical waveguide OL, and then emitted out from a drop port of the input-side optical waveguide IL. Optical signals each having a different wavelength are caused to flow, as they are, into a through port of the input-side optical waveguide IL. Moreover, an optical signal input through an add port of the output-side optical waveguide OL is sent into the through port of the input-side optical waveguide IL in order to be combined with a signal in the through port only when the wavelength of the sent optical signal is consistent with any resonant wavelength of the ring resonator RL.

A cross sectional structure of the input-side optical waveguide IL, the output-side optical waveguide OL and the ring resonator RL is substantially equivalent to that of the optical directional coupler described in embodiment 1.

Specifically, an insulator film made of silicon oxide is formed on a surface of a semiconductor substrate made of monocrystal silicon, and over this insulator film are formed the input-side optical waveguide IL, the output-side optical waveguide OL and the ring resonator RL, this situation being not illustrated. The thickness of the insulator film is from, for example, about 2 to 3 µm. The thickness and the width of each of the input-side optical waveguide IL, the output-side optical waveguide OL, and the ring resonator RL are each, for example, about 300 nm. Furthermore, the whole of the outer surface of the insulator film plus the input-side optical waveguide IL, the output-side optical waveguide OL and the ring resonator RL is covered with an interlayer dielectric. The interlayer dielectric is made of, for example, silicon oxide, and has a thickness of, for example, about 2 to 3 µm.

A side-surface of the portion functioning as the optical coupling portion of the input-side optical waveguide IL, the side-surface being opposite to the ring resonator RL, is larger in line edge roughness than respective side-surfaces of other portions that do not function as any optical coupling portion of the input-side optical waveguide IL. A side-surface of the portion functioning as the optical coupling portion of the output-side optical waveguide OL, the side-surface being opposite to the ring resonator RL, is larger in line edge roughness than respective side-surfaces of other portions that do not function as any optical coupling portion of the output-side optical waveguide OL. Furthermore, a side-surface of a portion functioning as an optical coupling portion of the ring resonator RL, the side-surface being opposite to the input-side optical waveguide IL, is larger in line edge roughness than respective side-surfaces of other portions that do not function as any optical coupling portion of the ring resonator RL.

The line edge roughness of the side-surfaces of the portions functioning as the respective optical coupling portions of the input-side optical waveguide IL, the output-side optical waveguide OL and the ring resonator RL is from, for example, 6 to 8 nm. The line edge roughness of the side-surfaces of the other portions that do not function as any optical coupling portion is, for example, 3 nm or less.

As described above, the opposite surfaces of the input-side optical waveguide IL and the ring resonator RL are increased in line edge roughness, as well as the opposite surfaces of the out-side optical waveguide OL and the ring resonator RL. Accordingly, antenna effect makes it possible to make the shift of light easy. By contrast, the side-surfaces of the other portions of the input-side optical waveguide IL, the output-side optical waveguide OL and the ring resonator RL are decreased in line edge roughness. Accordingly, the antenna effect is restrained so that a loss in the light transmission can be kept small.

Ring resonators as descried above, the number of which may be 2 or more, can be coupled in series to each other. By causing a refractive index change in the ring resonators, the resonant wavelength can be shifted so that a light ray having any wavelength can be produced. In the ring resonator wavelength filter illustrated in FIG. 12, the same ring resonators as illustrated in FIG. 11, the number of which is four, are coupled to each other.

In the same manner as in the above-mentioned single ring resonator wavelength filter, the opposite surfaces of each of the input-side optical waveguide IL and the (corresponding) ring resonator RL are increased in line edge roughness, as well as the opposite surfaces of each of the out-side optical waveguides OL and the (corresponding) ring resonator RL, and the respective surfaces of the ring resonators RL. Accordingly, antenna effect makes it possible to make the shift of light easy. By contrast, the respective side-surfaces of the other portions of the input-side optical waveguides IL, the output-side optical waveguides OL and the ring resonators RL are decreased in line edge roughness. Accordingly, the antenna effect is restrained so that a loss in the light transmission can be kept small.

FIGS. 11 and 12 have each illustrated a ring resonator wavelength filter in which opposite surfaces of an input-side optical waveguide (IL) and a or each ring resonator (RL) are increased in line edge roughness, as well as opposite surfaces of an output-side optical waveguide (OL) and the ring resonator (RL) and, if any, opposite surfaces of the ring resonators (RL). However, the present invention is not limited to this form. For example, the following maybe increased in line edge roughness: a side-surface of the input-side optical waveguide that is reverse to a ring-resonator-opposite-side side-surface of the waveguide; a side-surface of the output-side optical waveguide that is reverse to a ring-resonator-opposite-side side-surface of the waveguide; and all side-surfaces of the external shape of the ring resonator.

FIGS. 11 and 12 have each illustrated an example of a ring resonator having a ring-form shape surrounded by an elliptic external shape and an elliptic internal shape when viewed in plan. However, the present invention is applicable to a ring resonator which has a ring-form shape surrounded by a normally-circular external shape and a normally-circular internal shape.

FIG. 12 has illustrated a quaternary-in-series-joined ring resonator wavelength filter. However, the present invention is applicable to a binary- or tertiary-in-series-joined ring resonator wavelength filter.

The above have specifically described the present invention made by the inventors by way of embodiments thereof. However, the present invention is not limited to the embodiments. The embodiments may be variously modified as far as the modified embodiments do not depart from the scope of the subject matters of the invention.

What is claimed is:

1. An optical semiconductor device, comprising:
   a semiconductor substrate;
   a first insulator film formed over the semiconductor substrate;

a first optical waveguide formed over the first insulator film and comprising silicon, the first optical waveguide having a first optical coupling portion;

a second optical waveguide formed over the first insulator film and comprising silicon, the second optical waveguide having a second optical coupling portion that is spaced from the first optical coupling portion along the first optical coupling portion; and a second insulator film formed over the first insulator film to cover the first and second optical waveguides;

wherein the first and second optical coupling portions face each other;

wherein a side-surface of the first optical coupling portion that faces the second optical coupling portion has a line edge roughness that is larger than that of opposite side-surfaces of another portion of the first optical waveguide, the another portion of the first optical waveguide being any portion other than the first optical coupling portion, wherein a side-surface of the second optical coupling portion that faces the first optical coupling portion has a line edge roughness that is larger than that of opposite side-surfaces of another portion of the second optical waveguide, the another portion of the second optical waveguide being any portion other than the second optical coupling portion, wherein another side-surface of the first optical coupling portion that is opposite to the side-surface of the first optical coupling portion also has a line edge roughness that is larger than that of the opposite side-surfaces of the another portion of the first optical waveguide, and wherein another side-surface of the second optical coupling portion that is opposite to the side-surface of the second optical coupling portion also has a line edge roughness that is larger than that of the opposite side-surfaces of the another portion of the second optical waveguide.

2. The optical semiconductor device according to claim 1, wherein, in plan view, the first and second optical coupling portions are linear, and wherein the first and second optical coupling portions each have a length of 1 µm or more.

3. The optical semiconductor device according to claim 1, wherein, in plan view, the first optical coupling portion has a ring shape, and wherein, in plan view, the second optical coupling portion has a ring shape.

4. A method for producing an optical semiconductor device comprising a first optical waveguide having a first optical coupling portion, and a second optical waveguide having a second optical coupling portion along the first optical coupling portion, the first and second optical coupling portions being spaced from and facing each other, the method comprising:

(a) preparing an SOI substrate comprising a semiconductor substrate, a first insulator film over the semiconductor substrate, and a semiconductor layer over the first insulator film;

(b) applying a first photoresist over the semiconductor layer, and subsequently subjecting the SOI substrate with the first photoresist to dry exposure using an ArF excimer laser or to dry exposure using a KrF excimer laser, followed by developing treatment, so as to form a first resist pattern comprising the first photoresist over the semiconductor layer;

(c) using the first resist pattern as a mask to pattern the semiconductor layer to form a side-surface of the first optical coupling portion that faces the second optical coupling portion, and a side-surface of the second optical coupling portion that faces the first optical coupling portion, and subsequently removing the first resist pattern;

(d) applying a second photoresist over the semiconductor layer, and subsequently subjecting the SOI substrate with the second photoresist to liquid-immersion exposure using an ArF excimer laser, followed by developing treatment, so as to form a second resist pattern comprising the second photoresist over the semiconductor layer;

(e) using the second resist pattern as a mask to further pattern the semiconductor layer, so as to form other portions of the first and second optical waveguide, the other portions having opposite side-surfaces and being any portion other than the first and second optical coupling portions, and subsequently removing the second resist pattern; and (f) forming a second insulator film over the first insulator film to cover the first and second optical waveguides.

5. The method for producing the optical semiconductor device according to claim 4, wherein in (c), the following are also formed:
    another side-surface of the first optical coupling portion that is opposite to said side-surface of the first optical coupling portion; and
    another side-surface of the second optical coupling portion that is opposite to the side-surface of the second optical coupling portion.

6. The method for producing the optical semiconductor device according to claim 4, wherein in (e), the following are also formed:
    another side-surface of the first optical coupling portion that is opposite to the side-surface of the first optical coupling portion; and
    another side-surface of the second optical coupling portion that is opposite to the side-surface of the second optical coupling portion.

7. The method for producing the optical semiconductor device according to claim 4, wherein the patterning the semiconductor layer in (c) and (e) are such that the side-surface of the first optical coupling portion has a line edge roughness that is larger than that of the opposite side surfaces of the other portion of the first optical waveguide and that the side-surface of the second optical coupling portion has a line edge roughness that is larger than that of the opposite side surface of the other portion of the second optical waveguide.

8. The method for producing the optical semiconductor device according to claim 5, wherein the patterning the semiconductor layer in (c) and (e) are such that:

each of the side-surface of the first optical coupling portion and the another side-surface of the first optical coupling portion has a line edge roughness that is larger than that of the opposite side surfaces of the other portion of the first optical waveguide, and each of the side-surface of the second optical coupling portion and the another side-surface of the second optical coupling portion has a line edge roughness that is larger than that of the opposite side surface of the other portion of the second optical waveguide.

9. The method for producing the optical semiconductor device according to claim 6, wherein the patterning the semiconductor layer in (c) and (e) are such that:

the side-surface of the first optical coupling portion has a line edge roughness that is larger than that of the opposite side surfaces of the other portion of the first optical waveguide and that of the another side-surface of the first optical coupling portion, and the side-surface of the second optical coupling portion has a line edge roughness that is larger than that of the opposite side surface of the other portion of the second optical waveguide and that of the another side-surface of the second optical coupling portion.

10. The optical semiconductor device according to claim 1,
wherein a portion of the second insulator film is disposed between the facing side-surfaces of the first and second optical coupling portions,
the facing side-surface of the first optical coupling portion is a side-surface of a first core region of silicon of the first optical waveguide,
the facing side-surface of the second optical coupling portion is a side-surface of a second core region of silicon of the second optical waveguide,
the first core region is in direct contact with said portion of the second insulator film along the facing side-surface of the first optical coupling portion, and
the second core region is in direct contact with said portion of the second insulator film along the facing side-surface of the second optical coupling portion.

11. The optical semiconductor device according to claim 10, wherein a space between the facing side-surfaces, lengths of the first and second optical coupling portions, and differences in refractive indices between the first and second optical coupling portions and the second insulator are such that light is coupled between the first and second optical waveguides along the respective first and second coupling portions.

12. The optical semiconductor device according to claim 1,
wherein the line edge roughness of the side-surface of the first optical coupling portion that faces the second optical coupling portion is 6-8 nm,
wherein the line edge roughness of the side-surface of the second optical coupling portion that faces the first optical coupling portion is 6-8 nm, and wherein the line edge roughnesses of the opposite side-surfaces of the another portions of the first and second optical waveguides are 3 nm or less.

13. An optical semiconductor device comprising:

a semiconductor substrate;

a first insulating film formed over the semiconductor substrate;

a first core comprised of silicon;

a second core comprised of silicon; and a second insulating film formed over the first insulating film, the first core, and the second core;

wherein a first optical waveguide is formed by the first core and surrounding portions of the first and second insulating films, a second optical waveguide is formed by the second core and surrounding portions of the first and second insulating films, the first and second cores are spaced closer to each other in a coupling region than outside the coupling region, a side surface of the first core facing the second core in the coupling region has a line edge roughness larger than that of side surfaces of the first core outside the coupling region, a side surface of the second core facing the first core in the coupling region has a line edge roughness larger than that of side surfaces of the second core outside the coupling region, another side surface of the first core that is opposite to the side surface facing the second core in the coupling region also has a line edge roughness that is larger than that of the side surfaces of the first core outside the coupling region, and another side surface of the second core that is opposite to the side surface facing the first core in the coupling region also has a line edge roughness that is larger than that of the side surfaces of the second core outside the coupling region.

* * * * *